Aug. 31, 1948.　　C. R. CROWTHER ET AL　　2,448,254
PARACHUTE DEVICE ADAPTED TO BE LAUNCHED
FROM AN AIRCRAFT OR THE LIKE
Filed June 8, 1945　　6 Sheets-Sheet 1
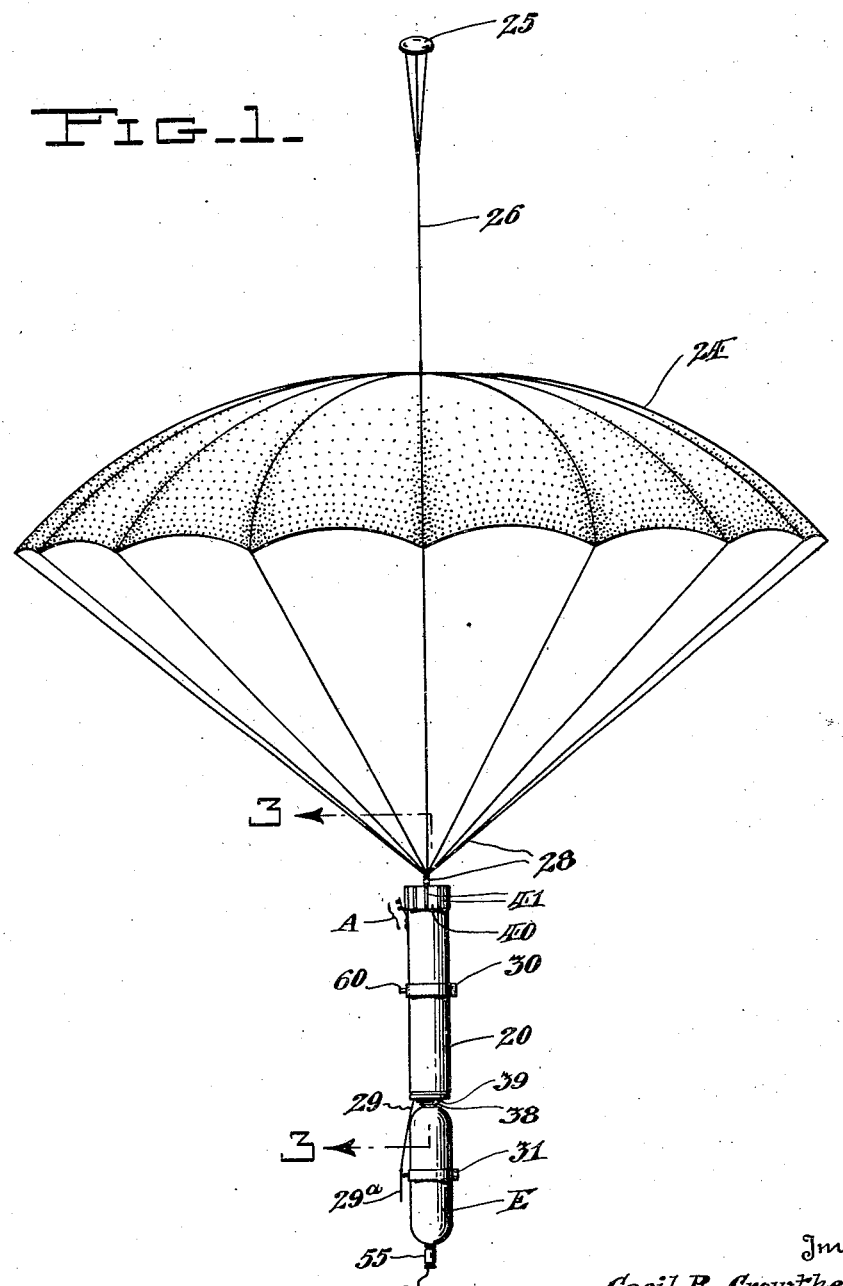
Inventors:
Cecil R. Crowther &
Walter E. Brown,
By Alfred E. Ischinger,
Attorney.

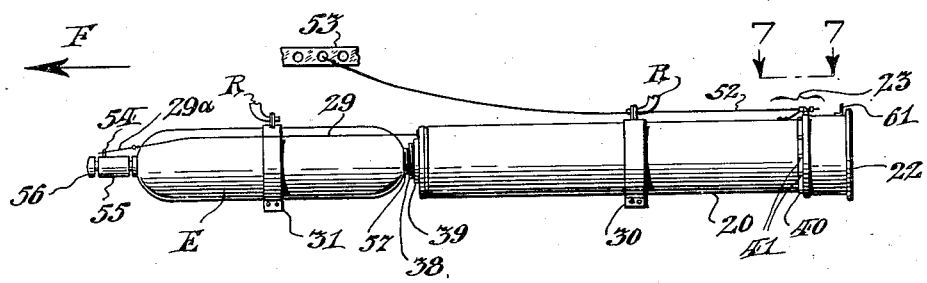
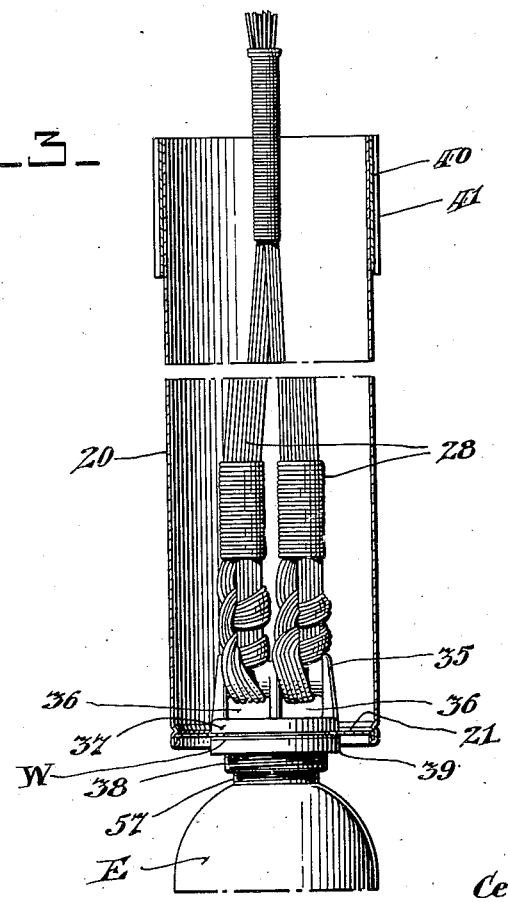

Aug. 31, 1948.    C. R. CROWTHER ET AL    2,448,254
PARACHUTE DEVICE ADAPTED TO BE LAUNCHED
FROM AN AIRCRAFT OR THE LIKE
Filed June 8, 1945    6 Sheets-Sheet 3
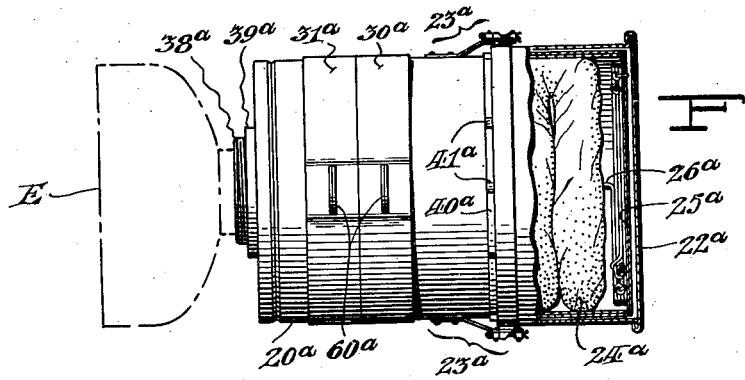
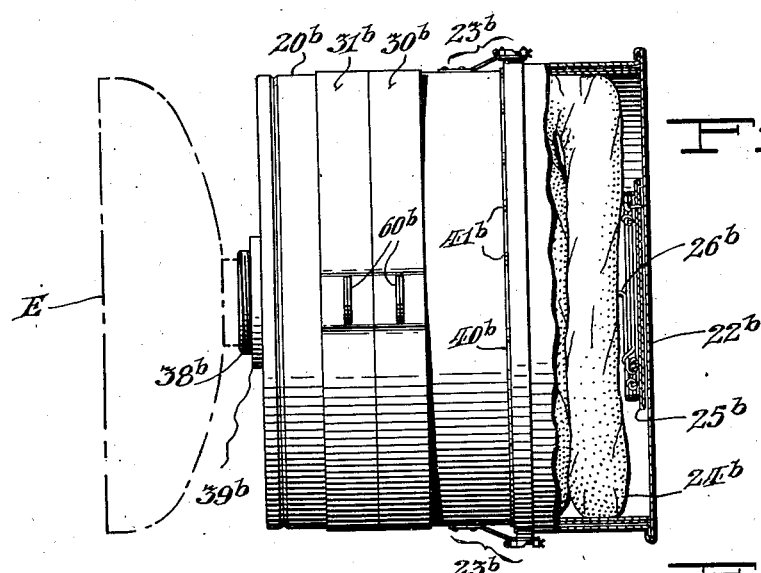
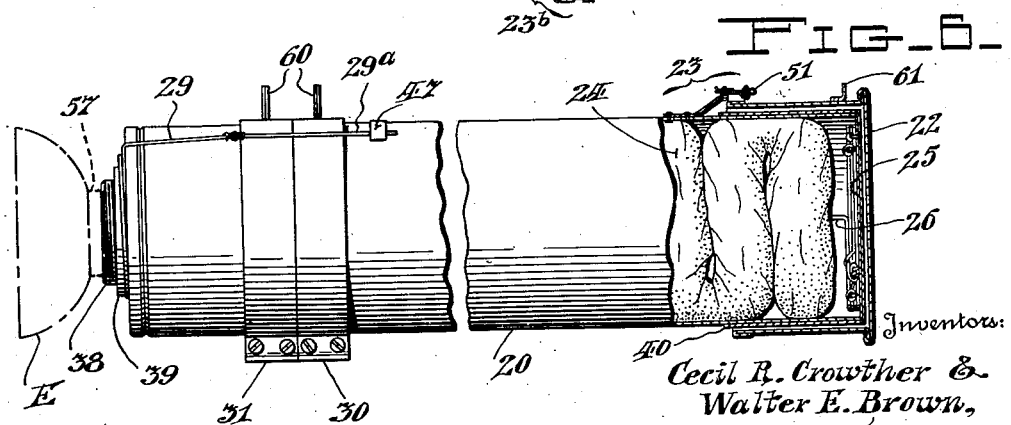
Inventors:
Cecil R. Crowther &
Walter E. Brown,
By Alfred E. Ischinger
Attorney.

Aug. 31, 1948.
C. R. CROWTHER ET AL
2,448,254
PARACHUTE DEVICE ADAPTED TO BE LAUNCHED
FROM AN AIRCRAFT OR THE LIKE
Filed June 8, 1945
6 Sheets-Sheet 4
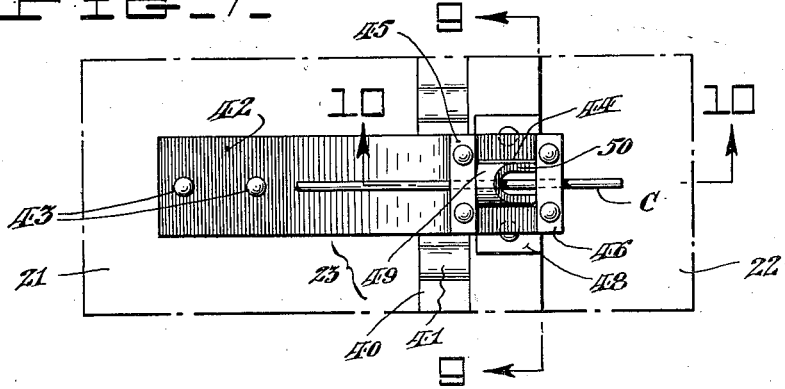
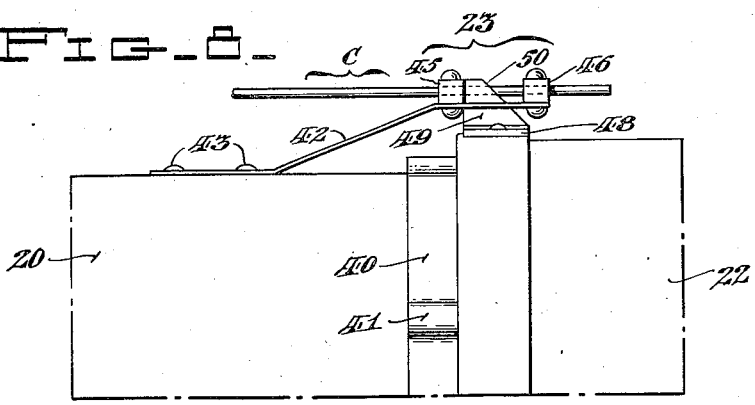
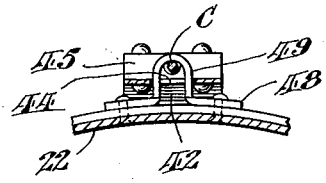
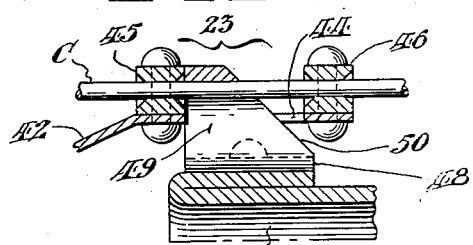
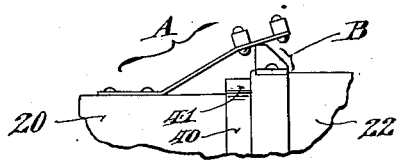
Inventors:
Cecil R. Crowther &
Walter E. Brown,
By Alfred E. Dickinger,
Attorney.

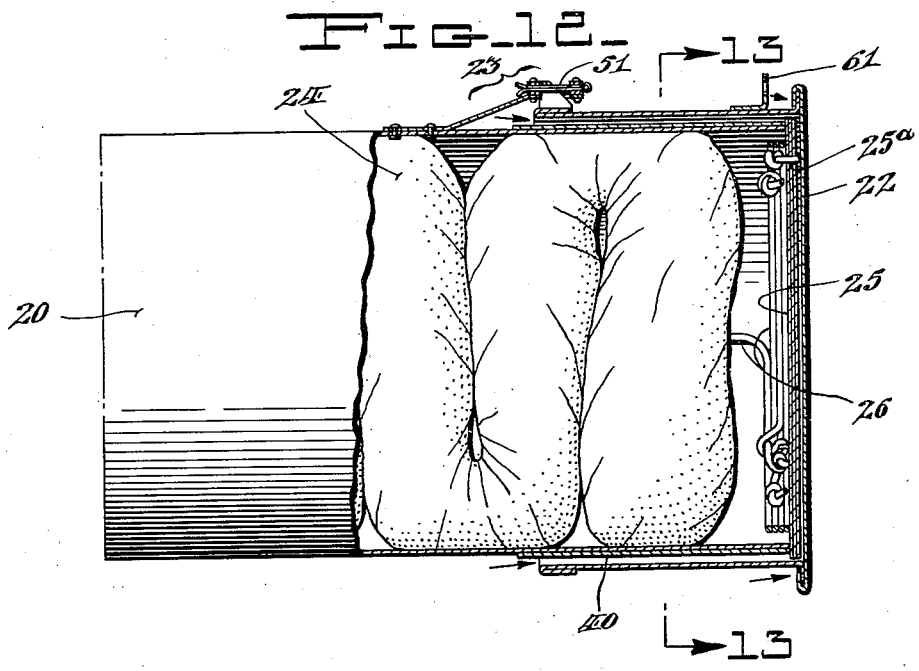
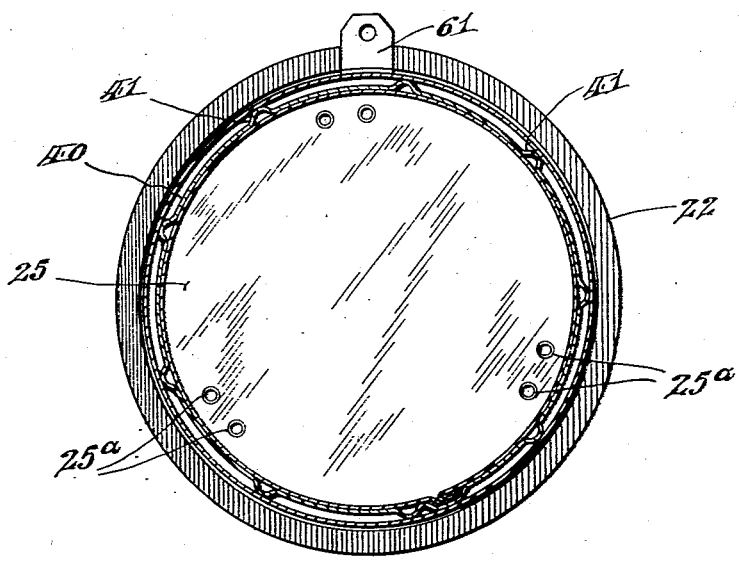

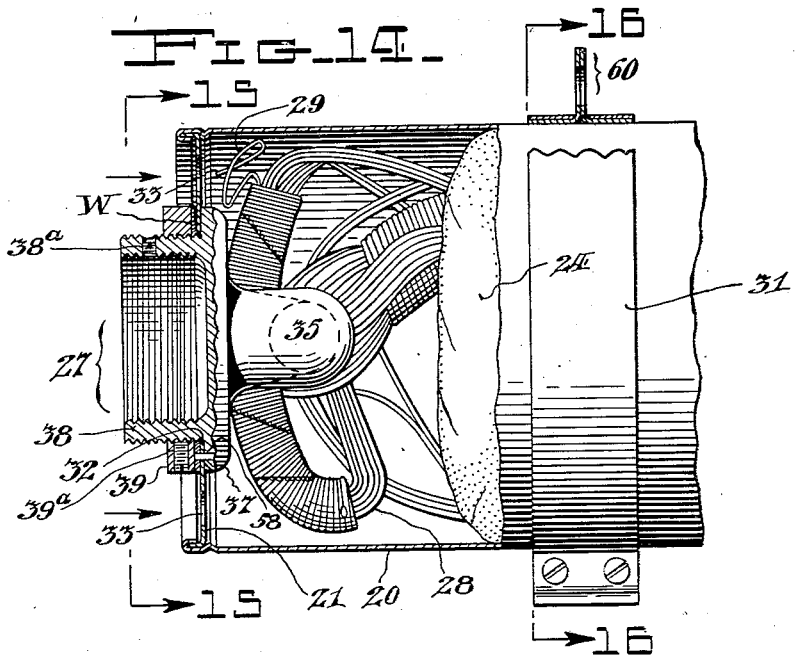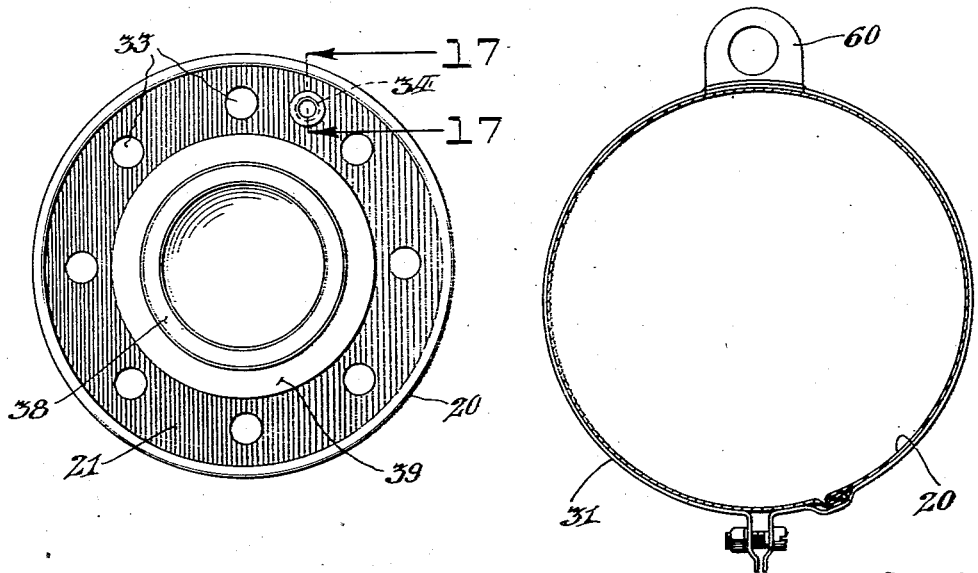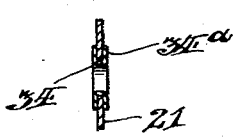

Patented Aug. 31, 1948

2,448,254

UNITED STATES PATENT OFFICE 2,448,254

PARACHUTE DEVICE ADAPTED TO BE LAUNCHED FROM AN AIRCRAFT OR THE LIKE

Cecil R. Crowther, Pennside, and Walter E. Brown, Reiffton, Pa., assignors to Reading Air Chutes, Inc., West Reading, Pa., a corporation of Pennsylvania Application June 8, 1945, Serial No. 598,284

19 Claims. (Cl. 244—138)

1

This invention relates to parachute units or devices of the type adapted to be launched from an aircraft or the like, for the purpose of conveying to the ground, or towards the same, a bomb, or some other object to be transported in this manner in connection with the performance of military or other operations.

One object of our invention is to provide a novel parachute unit of the indicated type, which has certain structural and functional features of advantage over the similar devices of the prior art.

Another object is to provide such a unit embodying novel fastening means adapted to function automatically when the unit is launched or dropped from an aircraft, thereby to permit separation from the unit of a member releasably connected therewith.

A further object is to provide such a unit which embodies a novel device adapted to have separably associated therewith a locking element arranged to be connected with the aircraft in such manner that the element will be automatically withdrawn from the device when the unit is launched from the aircraft.

An additional object is to provide such a unit which embodies certain novel cooperating elements arranged to have associated therewith means connected to the aircraft in such manner that the means will cause the elements to perform one function while the unit is carried by the aircraft, and another function when the unit is launched from the aircraft.

Another object is to provide such a unit with a parachute compartment having a novel end or bottom wall structure adapted to have anchored thereto the parachute cords and an object to be transported by the unit, which structure also includes novel air inlet means arranged to permit the development of an air pressure against the parachute pack at the proper time and to the proper extent to promote forceful ejection of the parachute from the compartment.

Another feature of our invention resides in the provision of such a unit having a novel closure member for the parachute compartment thereof, which member is separably associated with the unit in such manner that certain parts of the unit and member are spacedly related to

2 permit development of an air pressure of sufficient force against the member at the proper time to cause separation of the member from the unit.

Another feature resides in the provision of such a unit which is simple in construction, highly efficient in operation, and which readily lends itself to quantity production in various sizes and forms suitable for carrying out transportation operations involving articles or objects differing in weight and dimensional characteristics.

Among various other objects which indicate the subject matter comprehended within the scope of our invention, are, the embodiment in a parachute unit of one or more unique structural features such as a cylindrical parachute container or canister which is open at one end and has a wall structure at its opposite end provided with air inlet means; a cylindrical closure or cap member for the canister arranged to be separably associated with the open end thereof in spaced telescopic relation; one or more elements arranged to maintain the overlapping wall sections of the canister and closure member in spaced relation; complementary interlockable elements respectively secured to the canister and closure member, one of which elements is arranged to be automatically moved to a position of separation from the other element; and flexible means, such as a wire, adapted to be connected with the aircraft and cooperatively associated with said elements so as to maintain the latter in interlocked relation while the parachute unit is carried by the aircraft and to permit unlocking separation thereof when the unit is launched from the aircraft.

With these and other objects in view, which will become more readily apparent from the following detailed description of various practical and illustrative embodiments of the parachute unit shown in the accompanying drawings, our invention comprises the novel elements, features of construction and arrangement of parts in cooperative relationship, as more particularly defined by the hereto appended claims.

In the drawings:

Figure 1 is a side elevational view of one form of our novel parachute unit, as it appears after being launched from an aircraft or the like and while in vertically descending flight.

Fig. 2 is a side elevational view of the unit shown in Fig. 1, as it appears before being launched, and when horizontally positioned in an aircraft or the like, in readiness for launching.

Fig. 3 is a partial, enlarged, vertical cross-sectional view, taken substantially as indicated by the arrows 3—3 on Fig. 1.

Figs. 4, 5 and 6 are similar side elevational views of three practical forms of our novel parachute unit, with a side wall section thereof broken away in each instance to disclose the folded arrangement of the parachute substantially as it appears when packed within the parachute compartment of each unit.

Fig. 7 is an enlarged detail plan view of the parts of our unit as seen by looking in the direction of the arrows 7—7 on Fig. 2, and more particularly shows certain cooperating complementary interlockable elements forming part of our invention, as they appear when maintained in interlocked relation while the unit is being carried by an aircraft or the like.

Fig. 8 is a side elevational view of the parts shown in Fig. 7.

Fig. 9 is a cross sectional detail view taken substantially as indicated by the arrows 9—9 on Fig. 7.

Fig. 10 is an enlarged longitudinal sectional view, taken substantially as indicated by the arrows 10—10 on Fig. 7.

Fig. 11 is a view similar to Fig. 8, but on a reduced scale, and shows the different position occupied by one of the elements under certain conditions.

Fig. 12 is an enlarged partial elevational and partial longitudinal sectional view of the right hand end of the unit shown in Fig. 6, and more particularly discloses the overlapping telescopic relationship of certain wall sections of the unit and separable parachute compartment closure member thereof.

Fig. 13 is a cross-sectional view, taken substantially as indicated by the arrows 13—13 on Fig. 12, with the parachute and pilot disc attaching cords omitted.

Fig. 14 is an enlarged elevational view of certain parts shown at the left hand end of the unit of Fig. 6, a portion of the side wall of the canister being broken away so as to more clearly disclose the structural details of the end wall of the parachute compartment and the construction and arrangement of the means for anchoring the ends of the parachute cords as well as the object to be transported by the parachute unit.

Fig. 15 is an end elevational view of Fig. 14, as seen by looking in the direction of the arrows 15—15 on the latter.

Fig. 16 is a cross-sectional detail view of certain parts, taken substantially as indicated by the arrows 16—16 on Fig. 14, and Fig. 17 is an enlarged detail sectional view through a certain eyelet member in the end wall of the parachute compartment, taken substantially as indicated by the arrows 17—17 on Fig. 15.

Referring to the drawings, Figs. 4, 5 and 6 illustrate three similar practical embodiments of the parachute unit of our invention, as they respectively appear when in readiness for shipment, or for the final step of having a bomb cooperatively associated therewith preparatory to installation of the combined unit and bomb in an aircraft or the like. In each of said figures, the dot-and-dash lines marked E represent partial outlines of various standard type bombs adapted to be associated with the respective units, and indicate the location and approximate diameters of such bombs relative to the units. In practice, the bombs E are usually selectively combined with the units in such order that the outside diameters of the bombs and units are in substantial correspondence with each other.

From the three noted illustrations it will be apparent that our novel parachute device or unit readily lends itself to quantity production or manufacture in various sizes and forms, and therefore, that it is especially designed to satisfy large scale military or other demands for a parachute unit which serves to satisfactorily transport articles or objects differing in weight and dimensional characteristics. As the description proceeds, it will become equally apparent that such variations in size or form do not necessitate any substantial change in the provision and cooperative arrangement of the constituent parts of the unit which are adapted to effect functioning of the device in the unique manner of our invention.

To facilitate an understanding of the construction and operation of our invention, the unit of Fig. 6 has been illustrated in detail throughout the remainder of the drawings, and the following description therefore more particularly applies to this specific form of our invention. To avoid repetition of the similar or modified devices depicted by Figs. 4 and 5, the parts of the latter figures which structurally and functionally correspond with the parts of the device of Fig. 6, are identified by the same reference characters. However, in Fig. 4 the exponent "a" has been added to the reference characters, and in Fig. 5 the exponent "b," for purposes of differentiation between the similar designations applied to the said three illustrations.

The unit of Fig. 6 generally comprises a cylindrical container or canister 20 which is open at one end and provided with a special wall structure 21 at its other end; a closure member, lid, or cap 22, which is separably combined with the open end of the canister 20 and releasably held in place on the latter by fastening means generally indicated by the numeral 23; a parachute 24; a circular parachute pilot element or disc 25 which is connected to the apex of the parachute 24 by flexible means 26; an anchoring member or coupling 27, adapted to have secured thereto the ends of the parachute cords 28, and a bomb E; a fuse pull-out or arming cord 29; and two suspension bands or straps 30 and 31, the upper portions of which are provided with suspension elements arranged to be connected with the usual suspension and automatic release means associated with a standard bomb-rack or yoke of an aircraft, after said bands have been substantially positioned on the unit and bomb as indicated in Fig. 2.

The container or canister 20 is constructed of rigid material, such as sheet metal, and the main body portion thereof is preferably formed of hot rolled blue annealed sheet steel shaped into a cylinder, with the free side edges of the sheet joined by an overlapping pressed lock seam construction of standard design, as indicated on a somewhat exaggerated scale in Figs. 13 and 16. Since the said cylinder mainly functions as a suitable compartment or housing for the parachute 24, when the latter is in the folded or packed condition as indicated in Figs. 4, 5 and 6, determination of the length and diameter of the cylinder is more particularly governed by the dimensions and arrangement of the particular parachute pack to be associated with the unit. Accordingly, the cylinder forming the parachute compartment is made sufficiently large to readily accommodate therein the parachute pack and its associated parts. The interior dimensions of the parachute compartment are determined to permit a particular parachute pack to be readily inserted and positioned therein, substantially as shown, and expelled therefrom through the open end of the completed container 20 in connection with the launching of the unit.

The wall structure 21 which forms the bottom end of the container 20 (see Figs. 14 and 15), comprises a separately formed circular metal disc member having a rim flange which is fixedly held in determined position between an annular ridge projecting inwardly from the wall of the cylinder, and the bent-over end edge section of the latter. The said wall structure 21 is provided with a relatively large central circular aperture 32 arranged for extension therethrough of a central portion of the coupling member 27, a series of similar air inlet apertures 33 uniformly arranged in spaced relationship about the aperture 32, and an eyelet aperture 34 located intermediate two of the apertures 33.

The pilot disc 25 is made of plywood or other lightweight rigid material, and is connected with the apex of the parachute 24 by flexible means 26, such as by braided rayon cords, the outer ends of which are looped through three pairs of apertures 25$^a$, and then tied by a suitable knot against the inner surface of the disc, substantially as more particularly indicated in Fig. 12. When the parachute 24 is packed within the unit, the disc 25 is positioned between the inner flat surface of the cap member 22 and the open end edge of the container 20, as clearly shown in Fig. 12. The diameter of the disc 25 is made shorter than the inside diameter of the member 22 so as to facilitate positioning and separating movement of these parts relative to each other.

The coupling or anchoring member 27 is cast or otherwise formed in practical manner, preferably from malleable iron, and comprises a boss or end section 35 shaped as shown in Figs. 3 and 14, and provided with apertures 36, a flange section 37, and an externally and internally threaded circular shank section 38 adapted to be extended from the inside of the container 20 through the aperture 32 so as to permit application to said shank of an internally threaded collar or nut 39. As clearly shown in Fig. 14, the collar 39 and the flange section 37 are positioned at opposite sides of the wall 21 in cooperative relation so as to firmly clamp the member 27 to the wall 21. One or more set screws 39$^a$ are mounted in the collar 39 to permit positional locking of the collar on the shank 38. The internally threaded portion of the shank 38 is adapted to receive and form the connecting means for the externally threaded member 57 of the bomb E, or the similar member of some other article to be transported by the parachute unit. One or more set screws 38$^a$ may also be mounted in the shank section 38 to permit locking of the connecting element 57 or the like to said shank section. If desired, a metal or other suitable washer W may be interposed between the wall 21 and collar 39, as shown in Fig. 14, and this washer may be fixedly secured in position by a pin 58 arranged to extend through the washer W wall 21 and into the flange section 37 of the coupling 27.

As more clearly indicated in Fig. 3, the ends of the parachute cords 28 pass through the apertures 36 of the coupling 27, and are combined or tied together in such manner that the cords are firmly connected with said coupling.

One end of the arming cord 29 is secured to the parachute cords 28 (see Fig. 14), and its free end portion is adapted to pass or extend through a brass or aluminum eyelet 34$^a$ secured in the aperture 34 of the wall structure 21. The free end of the cord 29 has a fuse release or arming wire 29$^a$ connected thereto, and the latter is fastened to the outside of the container 20 by suitable means, such as an adhesive retaining strip 47 provided and arranged to temporarily hold the wire in place against the parachute unit as shown in Fig. 6, until the unit is prepared for installation in an aircraft.

The two suspension bands 30 and 31 are preferably formed of metal, such as steel, and are provided with free apertured lower end sections adapted to have cooperatively associated therewith common screw bolts, nuts and lock-nut washers, as clearly shown in Figs. 14 and 16, so as to permit the bands to be loosened or tightened in connection with their proper positioning along the outside of the canister 20. While the parachute unit is in the form shown in Fig. 6, both of the bands 30 and 31 are secured to the canister 20. However, when the parachute unit is prepared for installation in an aircraft, and a bomb E has been secured to the threaded circular shank section 38 of the anchoring member 27 as shown in Fig. 2, the band 31 is transferred to the bomb and positioned substantially centrally thereof, as indicated. Each of the bands 30 and 31 has an apertured extension device 60 spot welded or otherwise secured to its upper end as shown in Figs. 14 and 16, which is adapted to be cooperatively connected to the release fingers R of a standard form of release mechanism associated with the aircraft, substantially as indicated in Fig. 2, thereby to maintain the combined parachute unit and bomb in determined association with the aircraft until released, as later on explained.

Adjacent to its open end, the container 20 has welded, riveted, or otherwise secured to its external surface, a metallic band or collar 40 which is provided with a plurality of uniformly spaced longitudinally extending pressed-out rib-like elements or projections 41. These elements are arranged to function as spacing and seating means for the closure or cap member 22. As will be apparent from Figs. 12 and 13, this arrangement not only maintains the overlapping wall sections of the member 22 and container 20 in desired determinedly spaced relation when the member 22 is seated on the container 20, but also permits seating and removal of the cap member 22 by an easy longitudinal sliding action involving very little friction.

The cap member 22 is releasably fastened or locked to the container 21 by the means more particularly disclosed in Figs. 7 to 11, comprising two complementary interlockable parts marked A and B, and an element C which, as later more fully explained, functions to maintain the parts A and B in interengaged or interlocked relation at one time, and at another time functions to effect unlocking separation thereof in connection with the launching of the parachute unit.

The part A comprises a flat resilient metal plate 42, formed of beryllium copper or the like, one end of which is secured to the container 20 by rivets 43, and the other end of which is adapted to be freely movable vertically and provided with a rectangular aperture 44, as well as two similar crosswise extending metal pieces or blocks 45 and 46 which are riveted to the plate 42, as shown. The blocks 45 and 46 are provided with similar centrally located circular bores or apertures, which are outwardly flared or countersunk at each end, and arranged in axially aligned relation with respect to each other. When in normal or relaxed condition, the spring plate 42 is arranged to position itself as shown in Fig. 11. However, when the free end of the plate 42 is depressed or moved by hand to the position shown in Figs. 7 to 10, it will be tensioned.

The part B comprises a rigid member 48, shaped as shown from bendable sheet metal stock such as stainless steel, and provided with a central arcuately formed portion 49 having an inclined cam edge 50. The part B may be fixedly secured to the cap member 22 by rivets as indicated, or in any practical manner. The part B is so located on the cap 22, that the arcuate portion 49 will extend through the rectangular aperture 44 in the plate 42, when the latter is depressed for the purpose of establishing the interlocked relation between the parts A and B as shown in Figs. 7 to 10.

In order to maintain the parts A and B in the aforesaid interlocked relation, the element C is slidably inserted through the axially aligned central apertures of the blocks 45 and 46 of the part A, and through the arcuate portion 49 of the part B, as clearly illustrated.

When the parachute unit of our invention has been completed and assembled as shown in Fig. 6, the part C may be provided in the form of a cotter pin 51 or the like, adapted to temporarily maintain the parts A and B interconnected or interlocked, so that the cap member 22 and the container 20 will be secured or fastened together until such time that the parachute unit is to be prepared for mounting or installation in an aircraft.

However, after a bomb E has been connected to the parachute unit, and these combined parts are mounted for launching on the suspension and release members or fingers R of an aircraft, as shown in Fig. 2, the cotter pin 51 is removed, and in its place is inserted a part C in the form of an element 52 arranged to function as a pullout means in connection with the launching operation of the parachute unit. The said element 52 may be a flexible steel wire, throughout, or a combination steel wire piece and flexible cord, one end of which is anchored or fixedly secured to a stationary part 53 of the aircraft as indicated in Fig. 2, and the other end of which is adapted to be associated with the elements A and B as shown in Figs. 7 to 10. In order that the free end of the element or wire 52 may be substantially maintained in axial alignment with the apertures in the blocks 45 and 46 of the part A and the arcuate portion 49 of the part B, the element 52 is directed or passed through a suitable aligning guide, such as provided by the aperture in the extension 60 of the strap 30, in adjacent relation to the respective finger R which extends through the same aperture.

*Installation and operation of parachute unit*

Assuming that the unit of Fig. 6 is to have a bomb E secured thereto, and that this combination is then to be installed in an aircraft for launching therefrom, the procedure involved is substantially as follows:

The arming wire connected to the outer end of the arming cord 29 is released from its temporary fastening means or retaining strip 47, and the cord otherwise freed for repositioning as later explained. The usual externally threaded attaching means or part 57 of a selected bomb E is turnably connected to the correspondingly internally threaded shank portion 38 of the coupling 27, and the part 57 locked in position by the set screw 38ª. The suspension strap 31 is moved from the canister 20 to a central position on the bomb E, and then firmly secured to the latter. The combined parachute unit and bomb assembly is then lifted or moved into proper position in the bomb bay of an aircraft, and the upper ends of the suspension straps 30 and 31 connected with the release members or fingers R, by insertion of the latter through the apertures provided therefor in the extension devices 60, so that the combined parachute unit and bomb will be horizontally suspended from the usual release apparatus or mechanism of the aircraft, as indicated in Fig. 2. The free end or tip of the element or wire 52 is then passed through the aperture in the extension 60 at the top of strap 30 in adjacent relation to the respective release member R. The cotter pin 51 is removed from its locking association with the elements A and B and in its place is inserted the said free end of element 52, thereby to maintain the elements A and B in interconnected or interlocked relation as before. Finally, the tip of the arming wire 29ª is brought into cooperative association with the safety device 54 of the standard type fuse 55 secured in the nose of the bomb E, which device 54 has previously been held in its safety position by a cotter pin or other means.

The bomb and parachute assembly is now arranged and connected substantially as depicted by Fig. 2, and in readiness for launching from the aircraft.

Assuming that the aircraft is in flight and moving in the direction indicated by the arrow F in Fig. 2, the launching and operating actions of the unit take place in substantially the following order:

When the unit is to be launched, the operator in the aircraft actuates the proper element arranged to effect withdrawal of the release fingers R from engagement with the devices 60 of the suspension straps 30 and 31, and the combined bomb and parachute unit then immediately moves downwardly and rearwardly away from the aircraft. Since the element 52 is secured to the aircraft, the said movement causes withdrawal of the free end of element 52 from the lock members A and B, with the result that the tensioned resilient spring plate 42 of the member A will be freed for movement to the position shown in Fig. 11, thereby effecting unlocking separation of the said members A and B. The bomb and parachute unit assembly is by this time in the slip stream area of the aircraft, and the pressure exerted by the rearward air flow (indicated by short arrows in Fig. 12) along the parachute unit which impinges against the surface of the outer rim section of the cap member 22, and the further pressure exerted by the air flow against the outer annular surface areas of the pilot disc 25 and cap member 22 which are in direct line with the annular channel formed by the overlapping wall sections of the member 22 and container 20, will cause the cap member to be forcibly removed from, or to fly off, the open end of the container 20. In the event that the free end of the spring member 42 has not functioned properly, i. e., has not moved to a position above or beyond the arcuate portion 49 of the member B, then the inclined cam edge 50 of the portion 49 will engage the adjacent inner edge of the plate 42 which defines the rectangular aperture through which the portion 49 normally extends, and the plate 42 will be pushed or forced upwardly by the cam edge 50 over the top of the portion 49 as the cap member 22 continues to move in a direction away from the container. After the cap member 22 flies off the container 20, the said cap member becomes separated from the pilot disc 25, and air pressure is then exerted against the entire flat surface of the disc 25 which faces the parachute unit. This will effect a pull on the apex portion of the parachute 24 through the medium of the connecting means or cords 26. As soon as the bomb and parachute unit is released from the aircraft, air pressure currents also flow through the air inlet apertures 33 in the end wall structure 21, thereby exerting a pushing force against the end of the parachute pack, which together with the pull exerted by the pilot disc 25, forces the parachute pack out through the open end of the container 20. As the parachute pack moves toward the open end of the container 20, or during its forced ejection therefrom, the arming cord 29 connected to the parachute cords 28, will also be pulled along with the latter at the proper time, and the tip of the arming wire 29ª moving with the arming cord 29 will consequently be withdrawn from the safety device 54 of fuse 55, so that the disc plunger 56 of the latter may operate as usual when striking an object, to effect explosion of the bomb E. Movement of the parachute pack away from the container will, of course, cause opening or unfolding of the parachute in usual manner.

After these various actions have taken place and the parachute has completely opened or unfolded, the bomb and unit assembly floats toward the ground in the form substantially as shown in Fig. 1, and with the disc plunger 56 freed to effect detonation of the bomb E upon impact with an object.

It will be understood that if the bomb E is provided with some other type fuse, such as a propeller or vane arranged to effect detonation of the bomb after a certain time period instead of by impact action, the arming wire 29ª may be similarly associated with the safety devices of such a fuse, or the arming cord and wire entirely eliminated in those instances where detonation of the bomb is not dependent upon preliminary release of a safety or other device.

Under certain conditions, and in accordance with certain military bombing practices, it is desirable to install two of the combined bomb and parachute units in juxtaposed parallel relation in an aircraft, in such manner that they can be simultaneously launched or released from the latter. When this practice is followed, a single element 52 may be utilized for cooperative association in tandem order with the lock means 23 of the two separate parachute units. This can be accomplished by substituting for the element or wire 52 shown in Fig. 2, a similar element, but one which is sufficiently longer so that its free end may be cooperatively associated with the members A and B of the first unit as disclosed in Fig. 2, then extended through a wire aligning eyelet or guide 61 secured to the cap member 22 of the first unit, thereafter curved in a U-shaped bend or arc beyond said guide 61 so that its free end may be extended from the opposite direction through the similar eyelet or guide 61 secured to the cap member 22 of the second unit, and thence through the members A and B of the second parachute unit, as in the case of the first unit, but from the opposite direction. It has been found in practice that when the wire is arranged in this manner, the latter will be properly withdrawn from the elements A and B of both units, that the cap members 22 will be released in quick succession, and that subsequent functioning of the two units will take place as above explained in connection with the description of the operation of a single parachute unit.

It will be understood that the above indicated order of steps taken to effect assembly of the parachute unit and article to be transported thereby, and installation of this combination in an aircraft or the like, may be varied in any practical manner as desired or considered best by those trained for this purpose.

*Modifications*

Referring to the two forms of the parachute unit depicted by Figs. 4 and 5, it will be noted that these mainly differ from the form disclosed by Fig. 6 in that they are comparatively shorter and of greater diameter. When the diameters of the containers 20 and cap members 22 dimensionally differ to the comparative extent of the units of Figs. 4 and 5, it becomes desirable to combine with each such unit two oppositely mounted fastening means 23, in order to overcome any tilting or cocking tendency of the cap member 22 in connection with its separating action from the container 20, as above explained. The installation procedure of a parachute unit provided with two fastening means 23, is carried out in the same manner as explained in connection with the unit of Fig. 6, except that in those instances where double fastening means 23 are provided, the suspension bands 30 and 31 are arranged to permit mounting or suspension of the units in an aircraft so that the two fastening means 23 will be positioned at opposite sides of the units. This arrangement therefore necessitates the employment of two wires or elements 52 for each parachute unit, and the arrangement of these two elements along opposite sides of the unit to effect simultaneous unlocking of the said two fastening devices 23. Since the connection of the two elements 52 with the aircraft and operation of the devices 23 is otherwise the same as above explained, no further description seems necessary to an understanding of these modified arrangements. It is noted that the parachute pilot discs of the units of Figs. 4 and 5 are substantially the same in actual size as that shown in the unit of Fig. 6.

Of course, it will be apparent to those skilled in this art that our improved parachute unit or device can be changed and modified in various ways by substituting equivalent elements and materials in the cooperative combinations and arrangements herein disclosed, or in other ways more or less obvious from this disclosure, or within the scope of the hereto appended claims which more particularly define the invention.

We claim:

1. A parachute unit adapted to be launched from an aircraft or the like, comprising a parachute pack container which is open at one end and has a fixed wall structure at its other end adapted to have anchored thereto the parachute cords and the article to be carried by the unit, a separate closure member for said container adapted to be separately united with the open end of the latter, complementary interlockable elements respectively secured to the container and member, and means adapted to be connected to the aircraft and each of the elements in such manner as to maintain the latter interlocked while the unit is carried by the aircraft and to effect unlocking thereof when the unit is launched from the aircraft.

2. A parachute unit adapted to be launched from an aircraft or the like, comprising a parachute pack container which is open at one end and has a fixed wall structure at its other end adapted to have anchored thereto the parachute cords and the article to be carried by the unit, a separate closure member for said container adapted to be separably united with the open end of the latter, complementary interlockable latch elements respectively secured to the container and member, and flexible means adapted to be connected to the aircraft and each of the latch elements in such manner as to maintain the latter interlocked while the unit is carried by the aircraft and to effect unlocking thereof when the unit is launched from the aircraft.

3. A parachute unit adapted to be launched from an aircraft or the like, comprising a rigid cylindrical parachute pack container which is open at one end and has a fixed wall structure at its other end adapted to have anchored thereto the parachute cords and the article to be carried by the unit, a separate rigid cylindrical closure member for said compartment adapted to be slidingly united with the open end of the latter, complementary interlockable latch elements respectively secured to the container and member, and wire means adapted to be connected to the aircraft and each of the latch elements in such manner as to maintain the latter interlocked while the unit is carried by the aircraft and to effect unlocking thereof when the unit is launched from the aircraft.

4. A parachute unit adapted to be launched from an aircraft or the like, comprising a container provided with a parachute compartment, a closure member for said compartment adapted to be separably united with the container, complementary interlockable latch elements respectively secured to the container and member, and means adapted to have one end thereof connected with the aircraft and the other end thereof withdrawably associated with each of said elements in such manner that said means will effect maintenance of the elements in interlocked relation while the unit is carried by the aircraft and will be withdrawn from each of the elements when the unit is launched from the aircraft.

5. A parachute unit adapted to be launched from an aircraft or the like, comprising a container provided with a parachute compartment, a closure member for said compartment adapted to be separably united with the container, complementary interlockable latch elements respectively secured to the container and member, resilient means arranged to effect positive unlocking separation of the elements, and means adapted to be associated with the aircraft and each of the elements in such manner as to maintain the latter interlocked while the unit is carried by the aircraft and to permit functioning of the resilient element separating means when the unit is launched from the aircraft.

6. A parachute unit adapted to be launched from an aircraft or the like, comprising a container provided with a parachute compartment, a closure member for said compartment adapted to be separably united with the container, complementary interlockable latch elements respectively associated with the container and member, resilient means associated with the element and arranged to effect positive unlocking movement of said one element relative to the other, and means adapted to be associated with the aircraft and elements in such manner as to maintain the latter interlocked while the unit is carried by the aircraft and to permit positive unlocking movement of said one element relative to the other when the unit is launched from the aircraft.

7. A parachute unit adapted to be launched from an aircraft or the like, comprising a container provided with a parachute compartment, a closure member at one end of said compartment adapted to be separably united with the container, a fixed wall structure at the opposite end of said compartment adapted to have secured thereto an object to be carried toward the ground by the parachute unit, two complementary interlockable latch elements respectively secured to the closure member and container, and means arranged to be removably combined with each of the latch elements to maintain the latter in interlocked relation.

8. A parachute unit adapted to be launched from an aircraft or the like, comprising a container provided with a parachute compartment, a closure member at one end of said compartment adapted to be separably united with the container, a fixed wall structure at the opposite end of said compartment provided with a plurality of air inlet apertures and a section adapted to have secured thereto an object to be carried toward the ground by the parachute unit, and means arranged to releasably connect the closure member and container.

9. A parachute unit adapted to be launched from an aircraft or the like, comprising a container provided with a parachute compartment, a closure member at one end of said compartment adapted to be separably united with the container, a fixed wall structure at the opposite end of said compartment provided with a series of air inlet apertures spacedly arranged about a central section adapted to have secured thereto an object to be carried toward the ground by the unit, and means arranged to releasably connect the closure member and container.

10. A parachute unit adapted to be launched from an aircraft or the like, comprising a container provided with a parachute compartment, a closure member at one end of said compartment adapted to be separably united with the container, a fixed wall structure at the opposite end of said compartment provided with spacedly arranged air inlet apertures, a device centrally associated with the outside of said wall and provided with connecting means for an object to be carried toward the ground by the parachute unit, and means arranged to releasably connect the closure member and container.

11. A parachute unit adapted to be launched from an aircraft or the like, comprising a container provided with a parachute compartment, a parachute within the compartment in folded condition, a closure member at one end of said compartment adapted to be separably united with the container, a fixed wall structure at the opposite end of said compartment provided with a central section surrounded by a series of spacedly arranged air inlet apertures, a bomb secured to said central section of the wall, means securing the ends of the parachute cords to said central section of the wall and means arranged to releasably connect the closure member and container.

12. A parachute unit adapted to be launched from an aircraft or the like, comprising a cylindrical container provided with a parachute compartment having an opening at one end thereof, a cylindrical closure member adapted to be separably united with the container in overlapping telescopic relation, means positioned between the overlapping wall sections of the members and container arranged to maintain said wall sections spacedly separated, and means arranged to releasably connect the member and container.

13. A parachute unit adapted to be launched from an aircraft or the like, comprising a cylindrical container provided with a parachute compartment having an opening at one end thereof, a cylindrical closure member adapted to be separably united with the container in overlapping telescopic relation, a plurality of elements arranged between the overlapping wall sections of the member and container so as to maintain said sections in substantially uniformly spaced relation, and means arranged to releasably connect the member and container.

14. A parachute unit adapted to be launched from an aircraft or the like, comprising a cylindrical container provided with a parachute compartment having an opening at one end thereof, a cylindrical closure member adapted to be separably united with the open end of the container in overlapping telescopic relation, a plurality of rib-like spacing elements on the container extending longitudinally between the overlapping wall sections of the member and container, and means arranged to releasably connect the member and container.

15. A parachute unit adapted to be launched from an aircraft or the like, comprising a cylindrical canister provided with an opening at one end thereof adapted to permit movement therethrough of a foldedly arranged parachute, a wall at the opposite end of the canister provided with one or more air inlet apertures, a parachute foldedly arranged within the canister and having the ends of the cords thereof connected with said wall, a cylindrical closure member adapted to be separably united with the open end of the canister in overlapping telescopic relation, means arranged to maintain the overlapping wall sections of the member and canister spacedly separated, complementary interlockable elements respectively associated with the canister and member, and means adapted to be associated with the aircraft and elements in such manner as to maintain the latter interlocked while the unit is carried by the aircraft and to effect unlocking thereof when the unit is launched from the aircraft.

16. A parachute unit adapted to be launched from an aircraft or the like, comprising a cylindrical canister provided with an opening at one end thereof adapted to permit movement therethrough of a foldedly arranged parachute, a wall at the opposite end of the canister provided with one or more air inlet apertures, a parachute foldedly arranged within the canister and having the ends of the cords thereof connected with said wall, a cylindrical closure member separably united with the open end of the canister in overlapping telescopic relation, means arranged to maintain the overlapping wall sections of the member and canister spacedly separated, complementary interlockable elements respectively associated with the canister and member, and flexible means adapted to be associated with the aircraft and elements in such manner as to maintain the latter interlocked while the unit is carried by the aircraft and to effect unlocking thereof when the unit is launched from the aircraft.

17. A parachute unit adapted to be launched from an aircraft or the like, comprising a cylindrical canister provided with an opening at one end thereof adapted to permit movement therethrough of a foldedly arranged parachute, a wall at the opposite end of the canister provided with one or more air inlet apertures, a parachute foldedly arranged within the canister and having the ends of the cords thereof connected with said wall, a cylindrical closure member separably united with the open end of the canister in overlapping telescopic relation, means arranged to maintain the overlapping wall sections of the member and canister spacedly separated, complementary interlockable elements respectively associated with the canister and member, and a wire adapted to be associated with the aircraft and elements in such manner as to maintain the latter interlocked while the unit is carried by the aircraft and to effect unlocking thereof when the unit is launched from the aircraft.

18. A parachute unit adapted to be launched from an aircraft or the like, comprising a cylindrical canister provided with an opening at one end thereof adapted to permit movement therethrough of a foldedly arranged parachute, a wall at the opposite end of the canister provided with one or more air inlet apertures, means associated with said wall adapted to have connected therewith an object to be carried toward the ground by the unit, a parachute foldedly arranged within the canister and having the ends of the cords thereof connected with said wall, a cylindrical closure member separably united with the open end of the canister in overlapping telescopic relation, means arranged to maintain the overlapping wall sections of the member and canister spacedly separated, complementary interlockable elements respectively associated with the canister and member, and means adapted to have one end thereof connected with the aircraft and the other end thereof withdrawably associated with the elements in such manner that said means will effect maintenance of the elements in interlocked relation while the unit is carried by the aircraft and will be withdrawn from the elements when the unit is launched from the aircraft.

19. A parachute unit adapted to be launched from an aircraft or the like, comprising a cylindrical canister provided with an opening at one end threeof adapted to permit movement therethrough of a foldedly arranged parachute, a wall at the opposite end of the canister provided with one or more air inlet apertures, a bomb secured to said wall, a parachute foldedly arranged within the canister and having the ends of the cords thereof connected with said wall, a cylindrical closure member separably united with the open end of the canister in overlapping telescopic relation, means arranged to maintain the overlapping wall sections of the member and canister spacedly separated, complementary interlockable elements respectively associated with the canister and member, and means adapted to have one end thereof connected with the aircraft and the other end thereof withdrawably associated with the elements in such manner that said means will effect maintenance of the elements in interlocked relation while the unit is carried by the aircraft and will be withdrawn from the elements when the unit is launched from the aircraft.

CECIL R. CROWTHER.
          WALTER E. BROWN.

REFERENCES CITED

The following references are of record in the file of this patent:

UNITED STATES PATENTS

| Number | Name | Date |
|---|---|---|
| 1,709,644 | Wiley | Apr. 16, 1929 |
| 1,793,729 | Askam | Feb. 24, 1931 |
| 1,909,158 | Albihn | May 16, 1933 |
| 2,179,506 | Jahant | Nov. 14, 1939 |
| 2,377,587 | Strong | June 5, 1945 |
| 2,382,442 | Rich | Aug. 14, 1945 |

FOREIGN PATENTS

| Number | Country | Date |
|---|---|---|
| 117,766 | Australia | Nov. 12, 1943 |
| 580,615 | Germany | July 13, 1933 |